(12) United States Patent
Baierl et al.

(10) Patent No.: US 10,336,645 B2
(45) Date of Patent: Jul. 2, 2019

(54) RARE EARTH METAL-DOPED QUARTZ GLASS AND METHOD FOR PRODUCING THE SAME

(71) Applicant: Heraeus Quarzglas GmbH & Co. KG, Hanau (DE)

(72) Inventors: Hardy Baierl, Donndorf (DE); Stephan Grimm, Jena (DE); Kay Schuster, Jena (DE); Jan Dellith, Jena (DE); Andreas Langner, Freigericht (DE); Gerhard Schoetz, Aschaffenburg (DE); Walter Lehmann, Leipzig (DE); Thomas Kayser, Leipzig (DE)

(73) Assignee: Heraeus Quarzglas GmbH & Co., KG, Hanau (DE)

( * ) Notice: Subject to any disclaimer, the term of this patent is extended or adjusted under 35 U.S.C. 154(b) by 0 days.

(21) Appl. No.: 15/634,634

(22) Filed: Jun. 27, 2017

(65) Prior Publication Data
US 2017/0369359 A1 Dec. 28, 2017

(30) Foreign Application Priority Data
Jun. 28, 2016 (EP) ..................................... 16176590

(51) Int. Cl.
*C03C 3/06* (2006.01)
*C03B 20/00* (2006.01)
(Continued)

(52) U.S. Cl.
CPC ................ *C03C 3/06* (2013.01); *C03B 20/00* (2013.01); *C03B 32/00* (2013.01); *C03B 19/066* (2013.01);
(Continued)

(58) Field of Classification Search
CPC ........ C03C 2201/34; C03C 2201/3405; C03C 2201/3411; C03C 2201/3417;
(Continued)

(56) References Cited

U.S. PATENT DOCUMENTS 7,981,824 B2 * 7/2011 Englisch ............. C03B 19/1469
501/54
2004/0173584 A1 * 9/2004 Onishi .................. C03B 23/043
219/121.55
(Continued)

FOREIGN PATENT DOCUMENTS

DE 102004006017 A1 7/2005
EP 0673888 B1 5/2000
(Continued)

OTHER PUBLICATIONS

Extended Search Report dated Dec. 16, 2016 in EP Application No. 16176590.4.

*Primary Examiner* — Noah S Wiese
(74) *Attorney, Agent, or Firm* — Panitch Schwarze Belisario & Nadel LLP

(57) ABSTRACT

A method for producing rare earth metal-doped quartz glass includes the steps of (a) providing a blank of the rare earth metal-doped quartz glass, and (b) homogenizing the blank by softening the blank zone by zone in a heating zone and by twisting the softened zone along a rotation axis. Some rare earth metals, however, show a discoloration of the quartz glass, which hints at an unforeseeable and undesired change in the chemical composition or possibly at an inhomogeneous distribution of the dopants. To avoid this drawback and to provide a modified method which ensures the production of rare earth metal-doped quartz glass with reproducible properties, during homogenization according
(Continued)

to method step (b), the blank is softened under the action of an oxidizingly acting or a neutral plasma.

11 Claims, 4 Drawing Sheets

(51) Int. Cl.
*C03B 32/00* (2006.01)
C03B 19/06 (2006.01)
H01S 3/17 (2006.01)

(52) U.S. Cl.
CPC ...... *C03B 2201/12* (2013.01); *C03B 2201/20* (2013.01); *C03B 2201/34* (2013.01); *C03B 2201/36* (2013.01); *C03C 2201/32* (2013.01); *C03C 2201/3488* (2013.01); *C03C 2203/52* (2013.01); *H01S 3/17* (2013.01)

(58) Field of Classification Search
CPC .... C03C 2201/3423; C03C 2201/3429; C03C 2201/3435; C03C 2201/3441; C03C 2201/3447; C03C 2201/3452; C03C 2201/3458; C03C 2201/3464; C03C 2201/347; C03C 2201/3476; C03C 2201/3482; C03C 2201/3488; C03C 2201/3494; C03C 2201/36; C03C 2203/52; C03B 32/00; C03B 20/00; C03B 19/066

See application file for complete search history.

(56) References Cited

U.S. PATENT DOCUMENTS

| 2005/0272588 | A1  | 12/2005 | Sato et al. |           |
|--------------|-----|---------|-------------|-----------|
| 2006/0174659 | A1* | 8/2006  | Ganz        | C03B 37/01211 65/412 |
| 2007/0145332 | A1  | 6/2007  | Koeppler et al. |       |
| 2008/0039310 | A1* | 2/2008  | Hayashi     | C03B 19/1415 501/55 |
| 2008/0066497 | A1* | 3/2008  | Weber       | C03B 19/06 65/17.6 |
| 2008/0271493 | A1* | 11/2008 | Nakanishi   | C03B 37/0124 65/382 |
| 2010/0005837 | A1* | 1/2010  | Nakanishi   | C03B 23/047 65/382 |
| 2010/0091360 | A1* | 4/2010  | Kuehn       | C03B 19/1453 359/355 |

FOREIGN PATENT DOCUMENTS

| EP | 1894896 A1    | 3/2008 |
| JP | 2007230814 A  | 9/2007 |
| WO | 2005054139 A1 | 6/2005 |

* cited by examiner

RARE EARTH METAL-DOPED QUARTZ GLASS AND METHOD FOR PRODUCING THE SAME

BACKGROUND OF THE INVENTION

The present invention relates to a method for producing rare earth metal-doped quartz glass. The method comprises the steps of:
(a) providing a blank of the rare earth metal-doped quartz glass, and
(b) homogenizing the blank by the blank being softened zone by zone in a heating zone and by twisting the softened zone along a rotation axis.

Moreover, the present invention relates to rare earth metal-doped quartz glass which contains rare-earth metal oxide in a concentration of 0.002 to 10 mole %.

Rare earth metal-doped quartz glass is used, for example, for the production of fittings and components for semiconductor manufacture or of fiber amplifiers or fiber lasers in laser technology. In the first-mentioned field of application, the dopants bring about an improvement of the dry etching resistance of the glass material, and in the second field of application, the dopants bring about the generation of the amplification of laser radiation in the host material quartz glass.

The rare earth metals include the elements scandium, yttrium, and lanthanum and the lanthanoids.

DE 10 2004 006 017 A1 describes the production of a laser-active quartz glass doped with rare-earth or transition metals. The publication starts from an aqueous slip which contains nanoscale $SiO_2$ particles produced by way of precipitation reaction, as well as start compounds for the dopants in the form of water-soluble hydrate compounds. After granulation, the still porous doped $SiO_2$ granulate is put into a graphite mold and vitrified by gas pressure, sintering into a blank of doped quartz glass. The graphite mold is first heated to a sintering temperature of 1600° C. while maintaining a negative pressure. After the sintering temperature has been reached, an overpressure of 5 bar is set in the furnace and the mold is kept at this temperature for about 30 minutes. During subsequent cooling to room temperature, the overpressure is further maintained up to a temperature of 400° C.

The $SiO_2$ blank obtained in this way is subsequently three-dimensionally homogenized. Homogenization takes place by thoroughly mixing the $SiO_2$ blank in several directions. This results in the absence of striae and in a distribution of the refractive index that is homogeneous in three dimensions.

JP 2007-230814 A describes the manufacture of rare earth metal-doped quartz glass, with a powder mixture being sintered under vacuum or by hot pressing into a quartz glass blank, and the quartz glass blank being subsequently homogenized by twisting. This yields a rare earth metal-doped quartz glass with a rare earth metal concentration between 1.2 and 5% by wt., a low bubble content and a low OH content. The range $<5\times10^{-6}$ is indicated for the refractive index distribution.

WO 2005/054139 A1 describes a method for producing a blank for a component of laser-active quartz glass by providing a blank of rare earth metal-doped, laser-active quartz glass with an OH content of less than 10 ppm and by three-dimensionally homogenizing the $SiO_2$ blank. Homogenization takes place by thorough mixing of the $SiO_2$ blank in several directions. This results in the absence of striae and in a distribution of the refractive index that is homogeneous in three directions.

It is known from EP 1 894 896 A1 that a laser-active, rare earth metal-doped quartz glass is produced by using a mixed powder containing quartz powder and two or more types of dope elements in a total amount of 1 to 20% by wt., wherein the dope elements comprise a first dopant selected from the group of N, C and F and a second type of dopant selected from the group consisting of Mg, Ca, Sr, Ba, Sc, Y, Ti, Zr, Hf, lanthanoids and actinoids. The mixed powder is molten by way of the Verneuil method in a reducingly acting atmosphere into a quartz glass blank. Bubbles with a total cross-sectional area of around 5 $mm^2$ are visually visible in a volume of 100 $cm^3$ glass, and the internal transmission for visible light is 80%/cm.

U.S. Patent Application Publication No. 2005/0272588 A1 relates to quartz glass for jigs. To enhance the plasma etching resistance to fluorine-containing etching gas, it is suggested that the quartz glass should be doped with metal oxides in a concentration between 0.1-20% by wt., wherein a first dopant is selected from the group 3B of the periodic table, and a second dopant from the group Mg, Ca, Sr, Ba, Sc, Y, Ti, Zr, Hf, lanthanides or actinoids. The bubble content can be reduced by hot pressing in argon atmosphere, resulting in a total cross-sectional area of less than 100 $mm^2$ per 100 $cm^3$ glass.

Hot homogenization normally takes place by twisting the doped quartz glass on a glass lathe, wherein the headstock in which the quartz glass body is clamped is rotated at different speeds. Homogenization was carried out in the past such that the doped quartz glass was homogenized by way of hydrogen-oxygen burners with oxygen excess and twisted, respectively, with the doped quartz glass being well mixed.

Some rare earth metals, however, show a discoloration of the quartz glass, which hints at an unforeseeable and undesired change in the chemical composition or possibly at an inhomogeneous distribution of the dopants.

It is therefore an objective of the present invention to provide a modified method which ensures the production of rare earth metal-doped quartz glass with reproducible properties.

Moreover, it is an objective of the present invention to provide a rare earth metal-doped quartz glass which shows a low fluctuation in the refractive index and which is also distinguished by a high homogeneity of its chemical and electrical properties.

BRIEF SUMMARY OF THE INVENTION

According to an embodiment of the method of the present invention, during homogenization according to aforementioned method step (b), the blank is softened under the action of an oxidizingly acting plasma or a neutral plasma.

The method according to the present invention serves to produce rare earth metal-doped quartz glass by using naturally occurring, but preferably synthetically produced, $SiO_2$ raw material in particle form, which is doped with the dopant or mixed with fine-particle powder of the dopant. The dopant concentration is typically in the range of 0.01 to 10 mole %.

The rare earth metal-doped $SiO_2$ raw material is processed into a porous intermediate product and is here present as a mechanically or thermally pre-densified compact or green body, but it may also form a loose bulk of particles or of a granulate of the $SiO_2$ raw material.

The sintering of the porous pre-densified or particulate intermediate product is, for instance, carried out by sintering in a cladding tube or for instance by gas pressure sintering in a sinter mold. The gas-pressure sinter mold normally contains parts of graphite or it consists of graphite, which during gas pressure sintering results in a melting atmosphere having a reducing action with respect to rare earth metals and silicon. The result of the sintering process is a blank of more or less transparent doped quartz glass. The "reducing action" of the sintering atmosphere manifests itself in that it yields a blank having an oxygen content lower than in the case of an oxidation state defined by stoichiometry. This oxygen content will be called "substoichiometric oxygen content" herein, and the corresponding oxidation state of the doped quartz glass will be called "reduced oxidation degree".

Sintering conditions with a reducing effect lead to chemical reactions and to the sectional enrichment of components with a reduced oxidation degree and to refractive index fluctuations which lead to increased scattering in the quartz glass and thereby reduce transmission.

The reducingly acting atmosphere can particularly influence the chemical valence of the rare earth ions. For instance, upon doping with Yb, the chemical valence of the ytterbium ions can be significantly reduced from $Yb^{3-}$ to $Yb^{2+}$. The glass appears to have a yellowish discoloration on account of the $Yb^{2-}$ amount.

The blank of the rare earth-doped quartz glass is subsequently subjected to a thermo-mechanical treatment under the action of an oxidizingly acting plasma. This treatment will also be called "plasma homogenization" herein. To this end, the blank is clamped into a rotation device, for instance into a glass lathe, which is equipped with at least one plasma heater for generating a hot plasma. The plasma heater is fed with a plasma gas which is suited to generate a plasma with an oxidizing action with respect to rare earth metals and silicon. A twisting region in which the glass is thoroughly mixed is created in the operative region of the plasma due to different rotation speeds of the blank holders at both sides.

The "oxidizing effect" of the plasma has the consequence that after the homogenization process, the oxidation degree of the doped quartz glass is on the whole higher than before. The oxidizing effect is produced by a component with an oxidizing effect with respect to rare earth metals and silicon or by several components with oxidizing effect in the plasma gas. The components with oxidizing effect include oxygen, chlorine and fluorine. In the simplest and preferred case, an oxygen-containing gas or a gas mixture is supplied to the plasma, for instance oxygen or air.

The "neutral plasma" is neither oxidizing nor reducing for the blank. This has the consequence that the oxidation degree of the doped quartz glass after the homogenization process is the same as before. The neutral plasma gases, which develop neither an oxidizing nor a reducing action with respect to rare earth metals and silicon, may include nitrogen and argon and helium.

The following effects are simultaneously achieved by way of the homogenization according to the invention under the action of an oxidizingly acting or neutral plasma:

1. The refractive index fluctuations which are present in the blank after gas pressure sintering are reduced by way of the mechanical thorough mixing of the glass. Scatter centers caused by refractive-index differences in the doped quartz glass are minimized, and the optical transmission is increased.
2. At least two oxidation stages can occur in rare earth metals as a rule. "Polyvalent ions" of this nature often show strong absorption bands in the visible and in the UV wavelength range. Rare earth metals that are not present in the highest oxidation stage will be summarized under the term "reduced species" herein.

The plasma consists partly or completely of free, positively and negatively charged particles (ions, electrons, radicals) which are very reactive. By twisting, fresh surface is permanently produced, so that the glass volume is gradually exposed to the oxidizing action of the plasma. As a result, reduced species are at least partly oxidized. The type of the plasma gas therefore influences the degree of oxidation and the electronic properties of the quartz glass after homogenization. A possible unfavorable electronic property of the reduced species is reduced or eliminated. For instance, ytterbium ions in the divalent form ($Yb^{2+}$) do not contribute to the laser process, so that in this state they lead to a reduction of the excited lifetime of the ytterbium ions or to a reduction of the laser efficiency of the laser glass, respectively. By oxidation into the trivalent state ($Yb^{3+}$), the drawback is eliminated.

The reduced species may have an impact on the refractive index of the glass. Optionally, due to the oxidizing treatment, this fraction of the refractive index difference and the accompanying scattering effect are eliminated or reduced.

3. In the production of synthetic quartz glass, chlorine-containing start substances, such as for instance chlorosilanes or chloroalkylsilanes, are normally used. Also, in the silica produced by precipitation, chlorine-containing start substances are often used because of their solubility. Moreover, for the production of the quartz glass blank, $SiO_2$ start materials and particulate or porous semifinished products are normally treated using chlorine or HCl so as to eliminate impurities and hydroxyl groups. Therefore, synthetically produced quartz glass often contains a certain amount of chlorine. This chlorine impurity can lead to the formation of bubbles in the blank and in subsequent hot processes and has a disadvantageous effect in some applications of the rare earth-doped quartz glass. It has been found that a part of the chlorine impurity is eliminated by the thermo-mechanical thorough mixing in oxidizingly acting plasma although the chlorine is chemically bound in the glass structure. Specifically, chlorine concentration peaks are eliminated and the chlorine concentration is made uniform through the component volume.

Arc torches are, for instance, suited as a plasma heater. However, it has turned out to be particularly useful when a microwave atmospheric pressure plasma or an inductively coupled plasma is produced.

The atmospheric pressure plasma is ignited at atmospheric pressure and, in contrast to a low-pressure or high-pressure plasma, it does not require a pressure vessel for maintaining a predetermined pressure level. The generator for the microwave-induced plasma is compact and inexpensive. By contrast, higher heating capacities are achievable by way of inductively coupled plasmas.

Preferably, a plasma gas that is free of hydrogen and hydrogen-containing compounds is preferably supplied to the plasma.

By comparison with rare earth metals, hydrogen has a reducing effect and prevents the neutral effect or therefore decreases the desired oxidizing effect of the plasma. Ideally, the plasma gas supplied to the plasma has therefore nominally no source for hydrogen.

As for a particularly high homogeneity of the refractive index distribution and elimination of reduced species, preference is given to a method variant in which the homogenization of the blank comprises two homogenization steps in which the blank is twisted in two directions that are perpendicular to each other.

Owing to two successive mixing operations for the blank in two directions perpendicular to each other, a homogenization is achieved in all spatial directions. This "three-dimensional homogenization" achieves the absence of striae and a homogeneous distribution of the refractive index in all directions.

The three-dimensional homogenization of a quartz glass body is described in EP 0 673 888 B1. This is helpful in case of particularly high requirements made on homogeneity, absence of bubbles and oxidation degree, but requires a lot of time and energy.

Preference is given to a procedure in which a rare earth metal-doped quartz glass is produced that contains rear-earth metal oxide in a concentration of 0.002 to 10 mole %, and has a fluctuation in the refractive index $\delta\Delta n$ which, based on a mean refractive-index difference $\Delta n$ with respect to undoped quartz glass, is less than 10%, and which has a bubble content represented by a TBCS value of less than 10, wherein a rare earth metal-doped quartz glass is further particularly preferably produced and has a mean chlorine content in the range of 300 to 3000 wt. ppm.

A mean chlorine content in the range of 300 to 3000 wt. ppm in synthetically produced quartz glass is for instance and preferably obtained in the production of the synthetic quartz glass by treating a porous semifinished product of the synthetically produced quartz glass in the form of a porous $SiO_2$ soot body by using chlorine or HCl to eliminate impurities and hydroxyl groups. After vitrification of the soot body, typically a mean chlorine content of more than 3000 wt. ppm is thereby obtained in the synthetically produced quartz glass, for instance 5000 wt. ppm and more. This chlorine loading is reduced by homogenization using a plasma by way of the above-described thermo-mechanical thorough mixing in oxidizingly acting plasma to a mean value ranging from 300 to 3000 wt. ppm, and this simultaneously leads to a homogenization of the chlorine concentration by way of the thoroughly mixed gas volume. It is therefore a desired effect of this process variant that, due to the use of chlorine during cleaning and drying of the $SiO_2$ body, a very high purity is available, and at the same time the chlorine content of the doped quartz glass can be reduced to an acceptable level by the subsequent plasma homogenization. Unwanted impurities are contained in the sub-ppm range. Preferably, the total metal content of Li, Na, K, Fe, Cu, Cr, Mn, Ni, Mo and W is at maximum 1 wt-ppm. Due to that high purity, the laser properties of the doped quartz glass are not negatively affected.

The rare earth metal-doped quartz glass, according to an embodiment of the present invention, has a fluctuation in the refractive index $\delta\Delta n$ which, based on a mean refractive index difference $\Delta n$ with respect to undoped quartz glass, is in the range of less than 10%, and that it has a bubble content represented by a TBCS value (total bubble cross section) of less than 10.

The rare earth metal-doped quartz glass, according to an embodiment of the present invention, is distinguished by a homogeneous distribution of the refractive index and by a low bubble content at the same time. The homogeneous distribution of the refractive index manifests itself in a low value for the measure $\delta\Delta n/\Delta n$, where the maximum refractive-index difference $\delta\Delta n$ over a measurement length is normalized to the mean refractive-index difference with respect to undoped quartz glass $\Delta n$. This measure is less than 10%.

As a measure of the bubble content of the rare earth metal-doped quartz glass, the so-called TBCS value is used. The TBCS value designates the sum of the cross-sectional areas (in $mm^2$) of all bubbles based on a unit volume of 100 $cm^3$. At a TBCS value of less than 0.5 a glass is substantially "free of bubbles".

The rare earth metal-doped quartz glass is producible with the help of the above-described method according to an embodiment of the present invention.

It preferably has a mean hydroxyl group content between 0.1 and 100 wt. ppm, and preferably a mean chlorine content in the range of 300 to 3000 wt. ppm.

The component of the rare earth metal-doped quartz glass is, for instance, laser active or laser passive and intended for use in laser technology or for use in semiconductor manufacture in an etchingly acting environment. A very low hydroxyl group content is desired for many of these applications. Preferably, the hydroxyl group content is less than 3 wt. ppm in the rare earth metal-doped quartz glass according to an embodiment of the present invention.

Chlorine reduces the refractive index of quartz glass. During use of the rare earth metal-doped quartz glass for the core of an optical fiber, the reduced refractive index yields a smaller numerical aperture (NA) of the fiber, which is desired for many laser applications because the coupling-in and radiation characteristics of the fiber and the beam quality are thereby improved. Specifically, the laser beam can be better focused, which allows a greater work distance between laser and article to be irradiated. This yields the lower limit of 300 wt. ppm for the mean chlorine content. On the other hand, chlorine may induce the formation of bubbles in subsequent hot process steps. It is also known that chlorine in quartz glass may lead to the formation of defects in the glass structure, which particularly manifests itself in an absorption increasing in time particularly when high-energy UV radiation is used, and which is also called "solarization". This yields the upper limit of 3000 wt. ppm for the mean chlorine content.

A mean chlorine content in the range of 300 to 3000 wt. ppm in synthetically produced quartz glass is, for instance, preferably obtained in the production of the synthetic quartz glass by treating a porous semifinished product of the synthetically produced quartz glass in the form of a porous $SiO_2$ soot body by using chlorine or HCl to eliminate impurities and hydroxyl groups. After vitrification of the soot body, typically a mean chlorine content of more than 3000 wt. ppm is thereby obtained in the synthetically produced quartz glass; for instance 5000 wt. ppm and more. This chlorine loading is reduced by homogenization using a plasma by way of the above-described thermo-mechanical thorough mixing in oxidizingly acting plasma to a mean value ranging from 300 to 3000 wt. ppm, and this simultaneously leads to a homogenization of the chlorine concentration by way of the thoroughly mixed gas volume. It is therefore a desired effect of this process variant that, due to the use of chlorine during cleaning and drying of the $SiO_2$ body, a very high purity is available, and at the same time the chlorine content of the doped quartz glass can be reduced to an acceptable level by the subsequent plasma homogenization. Unwanted impurities are contained in the sub-ppm range. Preferably the total metal content of Li, Na, K, Fe, Cu, Cr, Mn, Ni, Mo and W is at maximum 1 wt-ppm. Due to that high purity the laser properties of the doped quartz glass are not negatively affected.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Definitions and Measuring Methods

Figure 1:
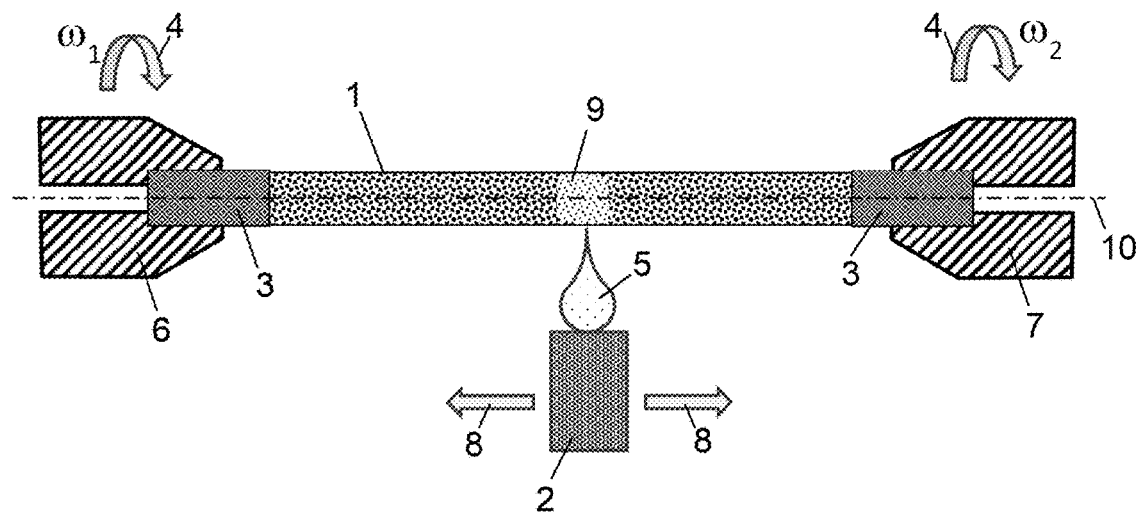
FIG. 1 shows the thermo-mechanical treatment process for plasma homogenization on the basis of a schematic representation.

Individual method steps and terms of the above description as well as measuring methods will now be defined in a supplementary manner. The definitions are part of the description of the present invention. The statements made in the description are governing in case of an inconsistency in the contents between one of the following definitions and the remaining description.

Quartz Glass

Quartz glass means, herein, a glass with a high silicic-acid content and with an $SiO_2$ proportion of at least 90 mole %.

Granulates

A distinction can be made between build-up granulation and press granulation and, in terms of the technical processes, between wet, dry and freeze granulation methods. Known methods are roll granulation in a pan granulator, spray granulation, centrifugal atomization, fluidized-bed granulation, granulation methods using a granulating mill, compaction, roller presses, briquetting, flake production, or extrusion.

Discrete, rather large agglomerates, herein called "$SiO_2$ granulate particles" or "granulate particles" for short, are formed during granulation by agglomerations of the $SiO_2$ primary particles. In their entirety, the $SiO_2$ granulate particles form a "$SiO_2$ granulate".

Purification

The granulate or a compact made from the granulate is normally purified prior to sintering. The main impurities are residual water (OH groups), carbonaceous compounds, transition metals, alkali metals and alkaline earth metals that derive from the feed material or are introduced by the processing operation. A low impurity content can already be achieved by using pure feed materials and corresponding equipment and processing under cleanroom conditions. To satisfy even higher demands made on purity, the granulate or the compact may be treated at a high temperature (up to 1200° C.) in a chlorine-containing and oxygen-containing atmosphere. Residual water evaporates in this process, organic materials react to form CO and $CO_2$, and many metals (such as for instance iron and copper) can be converted into volatile, chlorine-containing compounds.

Sintering/Densifying and Vitrifying/Melting

Here, "sintering" or "densifying" designates a process step in which a $SiO_2$ granulate is treated at an elevated temperature of more than 1100° C. either in a dynamic furnace (for instance in a rotary furnace) or in a static furnace. The specific surface area (BET) is here decreasing, whereas the bulk density and the mean particle size can increase due to agglomerations of granulate particles.

During "vitrifying" or "melting", the pre-densified, sintered $SiO_2$ granulate is vitrified while forming a quartz glass body.

Vacuum/Negative Pressure

The gas-pressure sintering process may include a negative pressure phase in which the intermediate product is heated under "vacuum." The negative pressure is indicated as an absolute gas pressure. Vacuum means an absolute gas pressure of less than 2 mbar.

Measurement of the Concentration of Hydroxyl Groups (OH Groups)

The measurement is carried out by way of the method presented by D. M. Dodd and D. B. Fraser, "Optical determination of OH in fused silica," *Journal of Applied Physics*, Vol. 37(1966), p. 3911.

Measurement of Radial Concentration Profiles of Components and Determination of the Mean Value of the Chlorine Concentration The measurement of concentration profiles for components of the rare earth metal-doped quartz glass, particularly of the rare earth metals contained therein and of chlorine, is carried out by way of a wavelength-dispersive X-ray fluorescence analysis (XRF) in combination with an electron probe micro analysis (EPMA) on measurement samples over a length of 2 mm at a measurement interval of 0.01 mm. The measurement value at the measurement length=1 mm is positioned as exactly as possible in the center of the measurement sample. The mean value of the chlorine concentration follows as an arithmetic mean of all measured values.

Measurement of the Fluctuation of the Refractive Index ($\delta\Delta n$)

The measurement of the refractive index profile is performed by way of a commercial profile analyzer "P104" of the company York Technology Ltd. The usual operating wavelength range of this device is 632.8 nm. The mean refractive index $\Delta n$ is determined from the refractive index profile as the refractive index difference with respect to undoped quartz glass. To minimize edge effects in the determination of the maximum refractive-index fluctuation $\delta\Delta n$ and the measure for the refractive index fluctuation $\delta\Delta n/\Delta n$, the refractive index profile is evaluated over a measurement length of $\frac{1}{3}\times r$ to $\frac{1}{2}\times r$, where r=radius of the cylindrical measurement sample (measured from the zero point in the sample center to the outside). The measure for the refractive index fluctuation $\delta\Delta n/\Delta n$ then follows as a maximum refractive-index difference $\delta\Delta n$ over the measurement length, based on the mean refractive-index difference $\Delta n$ with respect to undoped quartz glass. The normalization to $\Delta n$ takes into account the circumstance that the maximum refractive-index fluctuation $\delta \Delta n$ is normally increasing with the mean refractive index $\Delta n$.

Measurement of the Bubble Content

The TBCS value (English: Total Bubble Cross Section) designates the total cross-sectional area (in mm$^2$) of all bubbles within a sample based on a unit volume of 100 cm$^3$. The value is determined by visual detection of the bubbles and addition of the bubble cross-sections, where bubbles with diameters of less than 0.08 mm are not included.

Production of a Rod-Shaped Semifinished Product of Doped Quartz Glass

A slip of discrete, synthetically produced SiO$_2$ particles with a mean particle size of about 10 μm is prepared in ultrapure water. An amount of 285.7 g of the slip with a residual moisture of 37.4% is diluted with 1000 ml ultrapure water. A pH of 14 is set by adding a concentrated ammonia solution in an amount of 75 ml. The alkaline suspension is homogenized. For the production of a quartz glass doped with Yb$_2$O$_3$ and Al$_2$O$_3$, an aqueous dopant solution of AlCl$_3$ and YbCl$_3$ (mole ratio 4:1) is prepared in parallel in 400 ml ultrapure water. Instead of the chlorides, other start substances can also be used, for instance organic compounds, nitrides or fluorides.

The suspension, which is moved by stirring, is fed with the dopant solution in the form of an atomized spray for a period of 65 minutes. For the generation of the atomized spray, the dopant solution is atomized by means of a spray nozzle, with a work pressure of 2 bar and a flow rate of 0.8 l/h being set. The atomized spray produced in this way contains drops with a mean diameter between 10 μm and 40 μm. The high pH value of the suspension leads directly to a mixed precipitation of hydroxides of the two dopants in the form of Al(OH)$_3$ and Yb(OH)$_3$. The solid particles formed thereby adsorb on the existing surfaces of the SiO$_2$ particles and are thereby immobilized, thereby preventing a coagulation of the solid particles or a sedimentation. A dopant concentration of 2 mole % Al and 0.5 mole % Yb (based on the Si content of the suspension) is thereby set. Subsequently, the slip mixed with the dopants is homogenized by stirring for another 2 hours. This procedure ensures that an optimally homogenously doped SiO$_2$ slip is obtained.

The doped SiO$_2$ slip is frozen and further processed by so-called freeze granulation into a granulate. The granulate sludge obtained after thawing is repeatedly washed with ultrapure water, and the excessive water is respectively decanted.

Subsequently, the granulate sludge which is freed of ammonia and purified is dried at a temperature of around 400° C. for 6 hours. The dried granulate is welded into a plastic mold and isostatically pressed at 400 bar.

The granulate compact obtained in this way is heated while being washed with helium and is then treated in a chlorine-containing atmosphere at about 900° C. for about 8 hours. Impurities are thereby removed from the compact and the hydroxyl group content is reduced to about 3 wt. ppm. The chlorine content can be lowered by an aftertreatment in oxygen-containing atmosphere at a high temperature. Low concentrations of hydroxyl groups and chlorine facilitate the bubble-free sintering.

The purified granulate compact has a cylinder shape with a diameter of 30 mm and a length of 100 mm. Its mean density is about 45% of the density of the doped quartz glass. It is an intermediate product and is molten in a gas-pressure sintering process into a component of the doped, transparent quartz glass.

The gas-pressure sintering process is carried out in a gas-pressure sintering furnace with an evacuated sinter mold of graphite. The interior of the sinter mold is made cylinder-like and defined by a bottom and a sidewall of annular cross-section.

The partly densified sintered bodies are vitrified in a graphite mold at a temperature of 1700° C. by gas pressure sintering. The mold is first heated to the sintering temperature of 1700° C. while maintaining a negative pressure. After the sintering temperature has been reached, an overpressure of 15 bar is set in the furnace and the mold is kept at this temperature for about 30 min. During subsequent cooling to room temperature the overpressure is further maintained up to a temperature of 400° C. After cooling down to room temperature the quartz glass block is removed, and rods of a length of 20 cm and a diameter of 15 mm are drilled out.

Thermo-Mechanical Homogenization by Way of Oxidizingly Acting Plasma

The rod-shaped semifinished product is then homogenized by thermo-mechanical homogenization (twisting) and formation of a cylinder of rare earth metal-doped quartz glass. This treatment operation is schematically shown in FIG. 1. To this end, two holding rods 3 of undoped quartz glass are welded to the front ends of the rod-shaped semifinished product 1 by way of plasma burners. The holding rods 3 are clamped in the spindles 6, 7 of a glass lathe. The glass lathe is equipped with a plasma burner 2 which is fed with pure oxygen as plasma gas. The plasma burners 2 generate a plasma flame 5 which ignites in atmospheric pressure and has an oxidizing effect with respect to silicon and the rare earth metals. The plasma is excited by microwave excitation with a frequency of 2.45 GHz at a power of 6000 watts.

The plasma flame 5 is guided along the semifinished product 1 clamped in the glass lathe, and the product is thereby locally heated to more than 2000° C. Disparate rotation speeds ($\omega 1$, $\omega 2$) of the two glass lathe spindles 9, 10 create a twisting region 9 which is positioned in the heating region of the plasma flame 5. Thorough mixing takes place in this twisting region 9 and thus a homogenization of the glass. The plasma burner 2 is reversingly moved along the semifinished product 1 at a low speed (as outlined by the directional arrows 8) and the rod-shaped semifinished product 1 is twisted zone by zone about its longitudinal axis 10 and the softened glass mass is thereby intensively mixed over the whole length of the semifinished product. A glass cylinder with a diameter of about 15 mm and a length of about 100 mm is thereby obtained.

The oxidizingly acting microwave oxygen atmospheric pressure plasma 5 reduces the amount of chlorine and reduced species in the rare earth metal-doped quartz glass. This manifests itself by discoloration of the glass.

The rods of homogenized quartz glass were used as core rods for producing a preform for a laser fiber. To this end a fluorine-doped quartz glass as the cladding glass was built up by way of a plasma coating process on the core rods previously purified by etching in HF solution, thereby producing a laser fiber preform. This preform was subsequently further processed in the fiber drawing tower into a laser fiber. The laser fiber obtained thereby showed laser activity.

To determine the refractive index fluctuation, disc-shaped measurement samples are cut with a thickness of 10 mm out of the homogenized glass cylinder.

Figure 2:
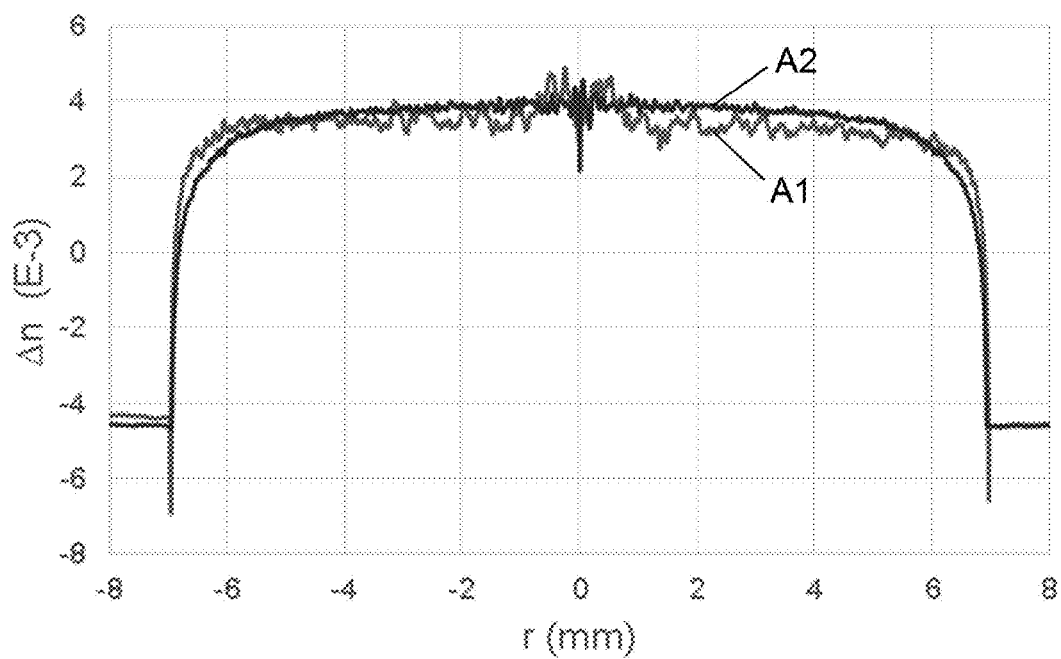
FIG. 2 is a diagram with a refractive index profile of an Yb-AI-F-doped quartz glass sample before and after homogenization.

FIG. 2 shows the typical refractive-index profile of a Yb—Al—F-doped quartz glass sample before (A1) and after homogenization (A2). On the y-axis, the refractive index difference Δn (×10$^{-3}$) is plotted (as difference value with respect to undoped quartz glass) against the radius r (in mm; normalized to the same radius). Before homogenization (refractive index profile A1), distinct refractive-index fluctuations manifest themselves. It is visible that after homogenization (refractive index profile A2), the refractive index fluctuations are considerably reduced. The evaluation of the refractive index profile (Δn) over the measurement length of ⅓×r to ½×r (measured from point 0 in the sample center to the outside) yielded a maximum refractive-index difference of 0.43×10$^{-3}$, which corresponds to the refractive index fluctuation Δn at the same time. The ratio δΔn/Δn which is normalized to Δn is here 7%. By comparison, the ratio δΔn/Δn before homogenization is 20%. This also manifests itself visually by way of improved transparence and reduced scattering of the homogenized sample.

The roundings of the refractive index profiles which are respectively observed in the edge region of the samples are due to artifacts of the algorithm with which the profile is calculated. These roundings are not real. The increasing refractive-index fluctuation in the central region is also due to an artifact. In regions where these artifacts are less dominant, even a fluctuation of the reactive index, δΔn, of 0.3×10$^{-3}$ (standard deviation 0.1×10$^{-3}$) is reached within the short range (here measured from radial position −3 mm to −2 mm) on the basis of the profile measurement in homogenized rods.

Figure 3:
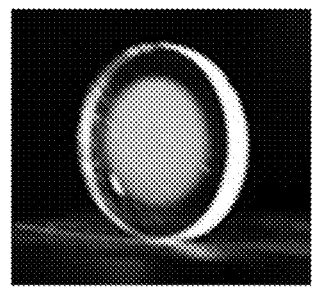
FIG. 3 is a photo of a disc-shaped sample on which the two attenuation spectra of FIG. 4 have been measured.

The photo of the measurement sample of FIG. 3 shows that the edge region of the sample is already more strongly homogenized due to the higher shear on the outside than the sample center which is comparatively inhomogeneous and shows an increased yellow coloration. The plasma homogenization was interrupted in this case before the oxidizing effect of the plasma, which is also determined by time-dependent diffusion processes, had also reached the central region of the torsion region.

Figure 4:
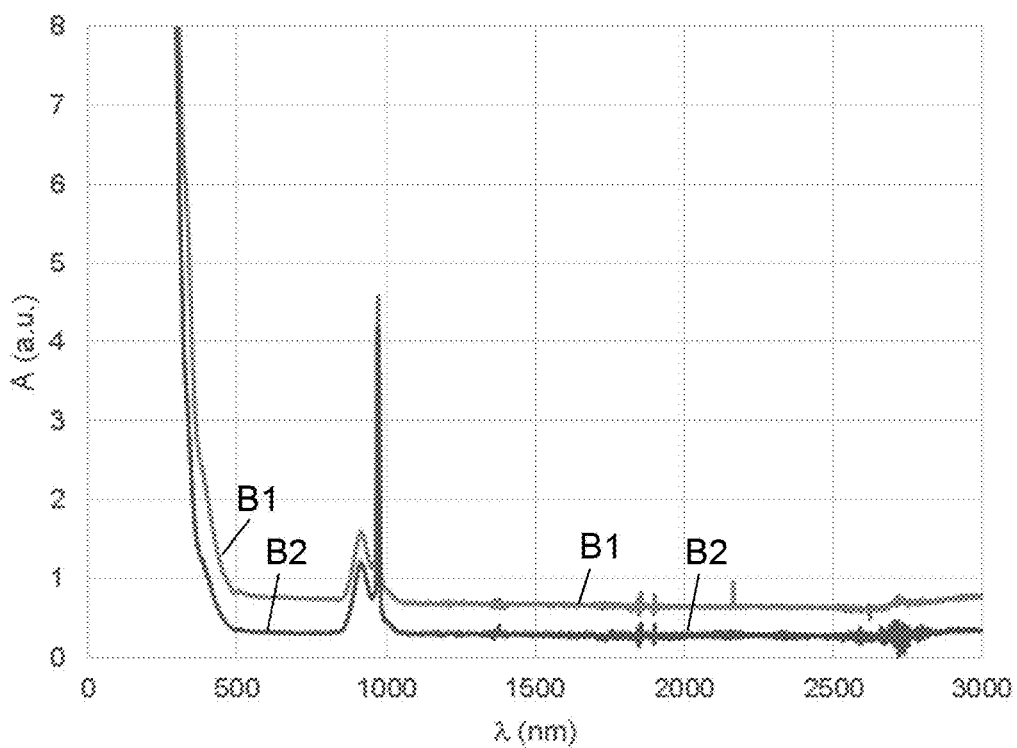
FIG. 4 is a diagram with attenuation spectra of the partly homogenized sample shown in FIG. 2.

The diagram of FIG. 4 shows the spectral absorption curve in the wavelength range of 250 to 3500 nm, measured on a Yb—Al-doped quartz glass sample which is only homogenized in part. The absorption A (in normalized unit) is plotted on the y-axis. The absorption curve B1 is assigned to the center of the measurement sample that is not homogenized yet, and the absorption curve B2 to the homogenized edge region. The basic damping (scatter fraction) in the associated absorption spectrum B2 of the homogenized sample region decreases due to the significant reduction of the scatter centers and the improvement of the material homogeneity in the edge region, wherein the ytterbium concentration does not significantly change between the individual sample regions if the scatter fraction in the spectra is deducted. Due to the plasma homogenization the Yb$^{3+}$/Yb$^{2-}$ balance is thus shifted in favor of Yb$^{3+}$. The absorption due to the divalent Yb$^{2+}$ ions, which do not contribute to the laser effect, is eliminated; this is visible in that the yellow coloration of the sample disappears in the homogenized edge region, and that the absorption curve B2 of the homogenized sample region decreases in the blue spectral range, whereby transmission is improved.

Due to the plasma homogenization the Yb$^{3+}$/Yb$^{2+}$ balance can be shifted in favor of Yb$^{3+}$, and it thus acts as an aftertreatment of the glass by heating in oxygen atmosphere, but much more efficiently in that constantly newly generated surface is exposed to the oxidizingly acting atmosphere during twisting. The plasma homogenization according to the invention fulfills a homogenization of the rare earth metal-doped quartz glass at different levels, namely on the one hand a mechanical thorough mixing that leads to an elimination of differences in the composition and a standardization of the refractive index of the glass and on the other hand a chemical treatment that effects a change and standardization of the electrical properties of the glass and also of the proportion of the refractive index that can be influenced by the electron configuration.

The aforementioned yellow coloration of the glass prior to plasma homogenization is due to the fact that, by comparison with Yb$^{3+}$, Yb$^{2+}$ has additional absorption bands in the blue spectral range. The shift of the Yb$^{3+}$/Yb$^{2+}$ balance after plasma homogenization can be observed in a purely visual manner by the yellow coloration decreasing in the glass.

The measurement samples only showed a few recognizable bubbles. The result of a visual evaluation of several typical measurement samples in the form of core rods and preforms is summarized in Table 1:

TABLE 1

| Dimensions [mm]<br>L = Length<br>Φ = Diameter | Bubble number | Mean bubble diameter [µm] | TBCS value |
|---|---|---|---|
| Preform | L = 845<br>Φ = 1.1 | 8 | 100 | 8 |
| Core rod | L = 1500<br>Φ = 15 | 25 | 300 | 6 |
| Core rod | L = 1500<br>Φ = 15 | 20 | 200 | 3 |

In all of these measurement samples the bubble content is smaller than the one represented by a TBCS value of 10.

The hydroxyl group content which is preset by the purification of the granulate compact does not increase due to the subsequent treatments. As is evident from FIGS. 5 to 8, the homogenization is however significant with respect to the chemical composition. These diagrams respectively show the distribution profile of specific components of the rare earth metal-doped quartz glass before and after plasma homogenization. The distribution profiles are based on electron probe micro analysis (EPMA), based on wavelength-dispersive X-ray spectroscopy (WDX)). On the y-axis, the respective dopant concentration is plotted (in mole % or in wt. ppm, respectively) over the measurement position (in mm). The measurement length is 2 mm.

Figure 5:
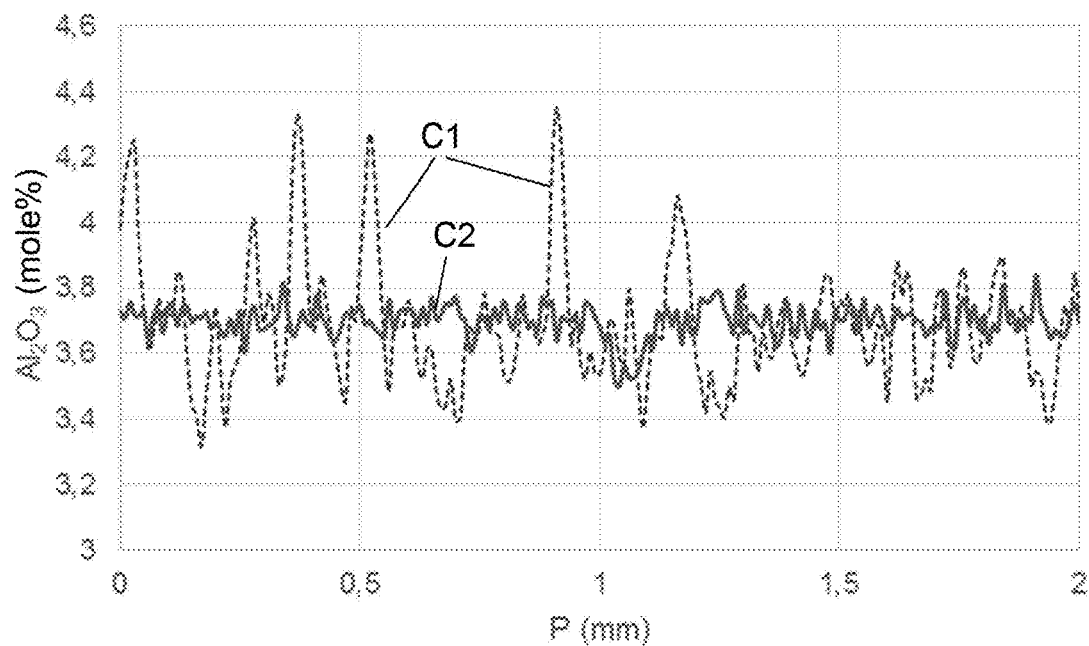
FIG. 5 is a diagram for comparing the WDX distribution profiles for aluminum oxide before and after plasma homogenization.
Figure 6:
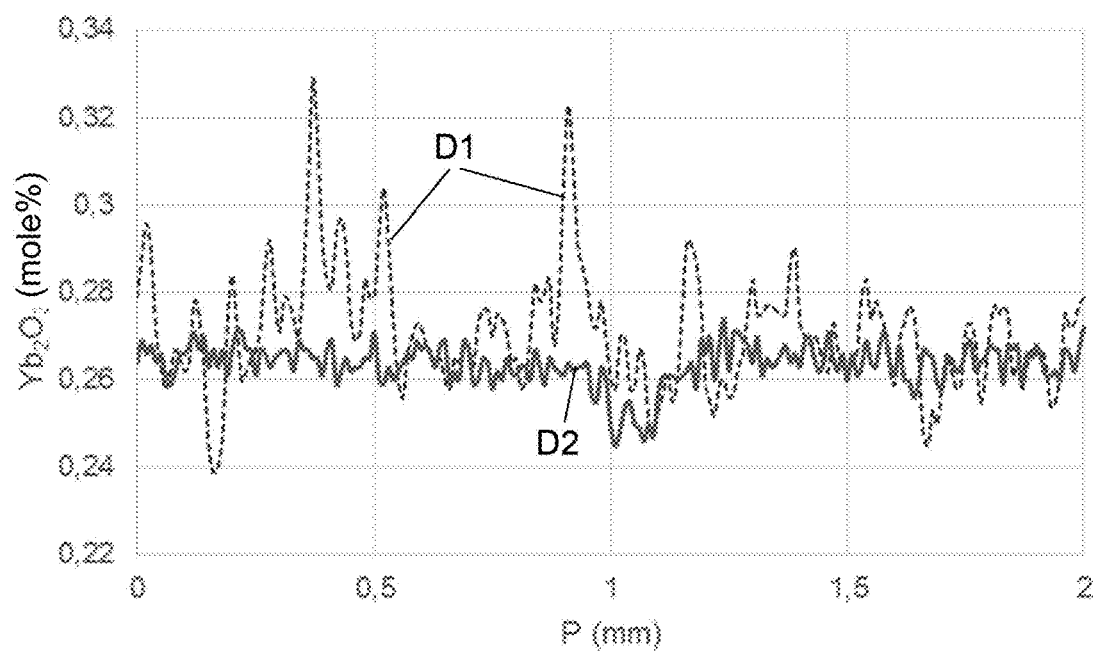
FIG. 6 is a diagram for comparing the WDX distribution profiles for ytterbium oxide before and after plasma homogenization.

The diagram of FIG. 5 shows the radial concentration distribution profiles of the dopant Al$_2$O$_3$ before (curve C1) and after (curve C2) plasma homogenization, and the diagram of FIG. 6 shows the radial distribution profiles of the dopant Yb$_2$O$_3$ before (curve D1) and after (curve D2) plasma homogenization. In both cases the profile smoothing after plasma homogenization (curves C2, D2) is significant.

Figure 7:
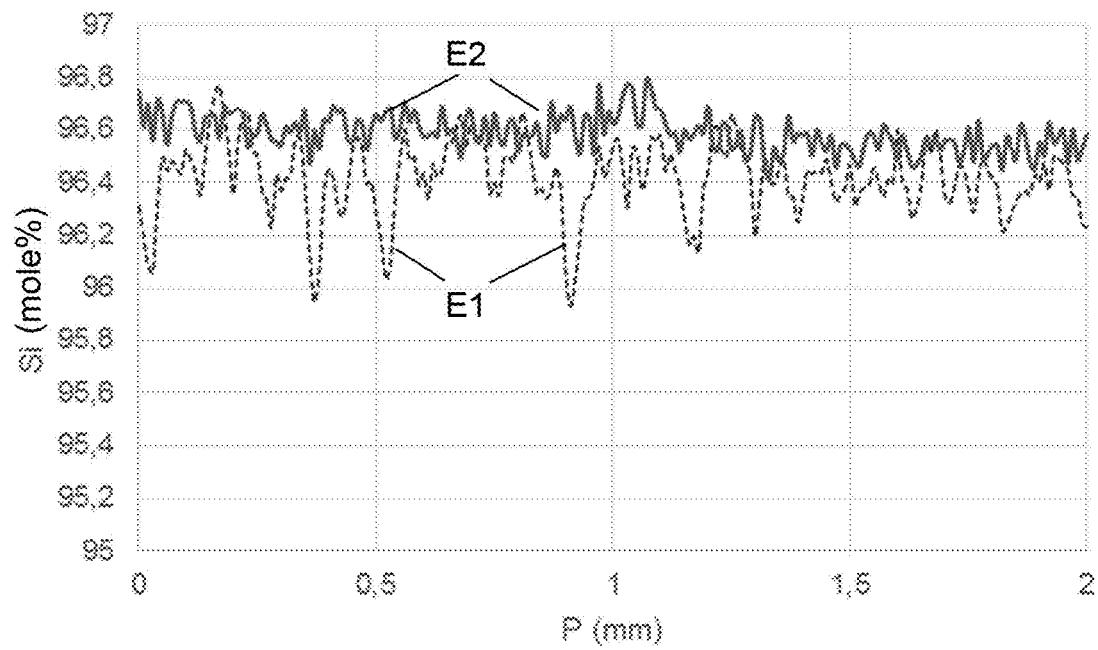
FIG. 7 is a diagram for comparing the WDX distribution profiles for silicon oxide before and after plasma homogenization.

The diagram of FIG. 7 also shows a distinct smoothing of the radial concentration distribution profile for the main component of the material—SiO$_2$— after plasma homogenization (curve E2) by comparison with the profile before plasma homogenization (curve E1).

Figure 8:
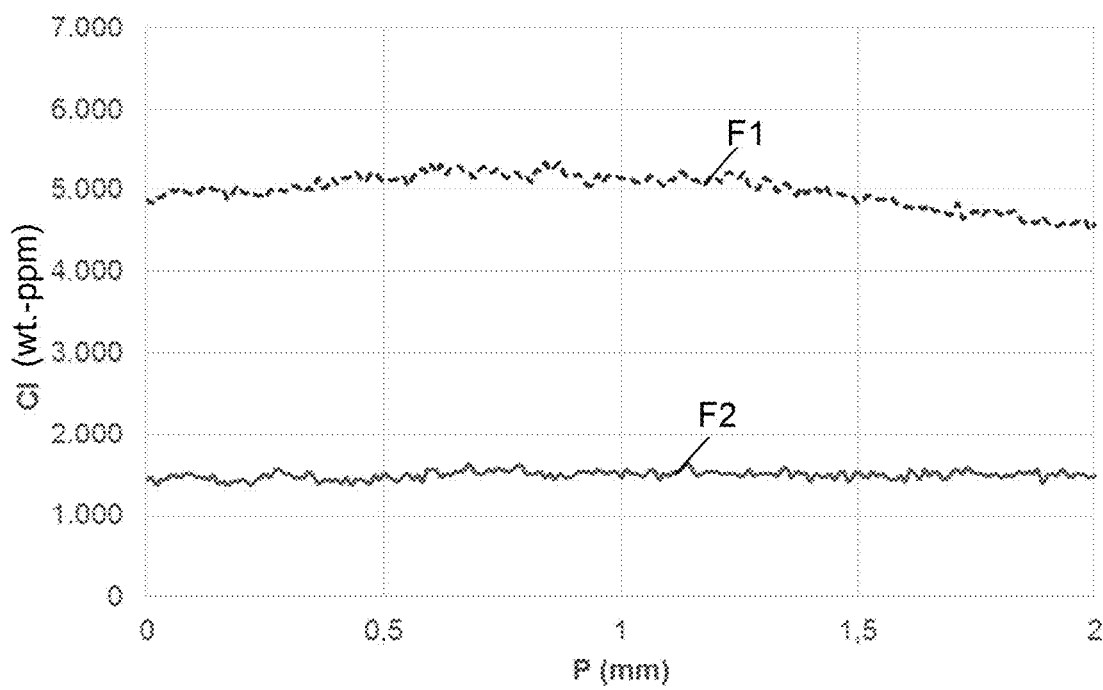
FIG. 8 is a diagram for comparing the WDX distribution profiles for chlorine before and after plasma homogenization.

It is apparent from the diagram of FIG. 8, which shows the radial distribution profiles of chlorine before (curve F1) and after (curve F2) plasma homogenization, that the chlorine concentration is considerably reduced on the one hand by plasma homogenization to about ¼ of the initial value, and that a more homogeneous distribution of the chlorine concentration is obtained on the other hand.

This effect of the plasma homogenization is above all desirable for the reason that the mean value of the chlorine concentration is set to a value of about 1500 wt. ppm, which turns out to be a suitable compromise in relation to refractive index and UV radiation resistance of the glass and that unnecessary concentration maxima for chlorine are avoided on the other hand, as shown by curve F1 in the sample center. The chlorine concentration values indicated in the figure refer to pure quartz glass; dopants are not considered.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. Method for producing rare earth metal-doped quartz glass, the method comprising the steps of:
   (a) providing a blank of the rare earth metal-doped quartz glass; and
   (b) homogenizing the blank by softening the blank zone by zone in a heating zone and by twisting the softened zone along a rotation axis,
   wherein during homogenization according to method step (b), the blank is softened under the action of an oxidizingly acting or neutral plasma.

2. Method according to claim 1, wherein an oxygen-containing gas is supplied to the plasma.

3. Method according to claim 1, wherein a microwave atmospheric pressure plasma or an inductively coupled plasma is generated.

4. Method according to claim 1, wherein a plasma gas which is free of hydrogen or hydrogenous compounds is supplied to the plasma.

5. Method according to claim 1, wherein a rare earth metal-doped quartz glass is generated that contains rare earth metal oxide in a concentration of 0.002 to 10 mole % and has a fluctuation in the refractive index $\delta\Delta n$ which based on a mean refractive index difference $\Delta n$ with respect to undoped quartz glass is less than 10%, and has a bubble content represented by a total bubble cross section (TBCS) value of less than 10.

6. Method according to claim 1, wherein a rare earth metal-doped quartz glass is produced that has a mean chlorine content in the range of 300 to 3000 wt. ppm.

7. Method according to claim 2, wherein a microwave atmospheric pressure plasma or an inductively coupled plasma is generated.

8. Method according to claim 2, wherein a rare earth metal-doped quartz glass is produced that has a mean chlorine content in the range of 300 to 3000 wt. ppm.

9. Method according to claim 3, wherein a rare earth metal-doped quartz glass is produced that has a mean chlorine content in the range of 300 to 3000 wt. ppm.

10. Method according to claim 5, wherein the rare earth metal-doped quartz glass has a mean hydroxyl group content between 0.1 and 100 wt. ppm.

11. Method according to claim 6, wherein the rare earth metal-doped quartz glass has a mean hydroxyl group content between 0.1 and 100 wt. ppm.

* * * * *